(12) United States Patent
Piper

(10) Patent No.: US 10,097,613 B2
(45) Date of Patent: Oct. 9, 2018

(54) SYSTEMS AND METHODS FOR ENHANCING PERFORMANCE OF RESOURCE STATE POLLING

(71) Applicant: Lenovo Enterprise Solutions (Singapore) Pte. Ltd., New Tech Park (SG)

(72) Inventor: Scott A. Piper, Austin, TX (US)

(73) Assignee: Lenovo Enterprise Solutions (Singapore) Pte. Ltd., New Tech Park (SG)

(*) Notice: Subject to any disclaimer, the term of this patent is extended or adjusted under 35 U.S.C. 154(b) by 193 days.

(21) Appl. No.: 14/864,012

(22) Filed: Sep. 24, 2015

(65) Prior Publication Data
US 2017/0093951 A1    Mar. 30, 2017

(51) Int. Cl.
*G06F 15/173* (2006.01)
*H04L 29/08* (2006.01)
*H04L 12/26* (2006.01)
*H04L 12/24* (2006.01)

(52) U.S. Cl.
CPC .............. *H04L 67/02* (2013.01); *H04L 43/02* (2013.01); *H04L 43/067* (2013.01); *H04L 67/142* (2013.01); *H04L 41/5083* (2013.01)

(58) Field of Classification Search
CPC ... H04L 43/067; H04L 67/02; H04L 41/5083; H04L 43/02; H04L 43/04
USPC .................................................. 709/223, 224
See application file for complete search history.

(56) References Cited

U.S. PATENT DOCUMENTS

| | | | | |
|---|---|---|---|---|
| 2005/0266859 | A1* | 12/2005 | Tejani | H04L 69/329 455/456.4 |
| 2008/0247320 | A1* | 10/2008 | Grah | H04L 41/5012 370/241 |
| 2008/0306985 | A1* | 12/2008 | Murray | G06Q 10/10 |
| 2009/0199196 | A1* | 8/2009 | Peracha | G06F 11/3409 718/104 |

(Continued)

FOREIGN PATENT DOCUMENTS

WO    WO2015/026476 A2 *  2/2015

OTHER PUBLICATIONS

Bryan et al., JavaScript Object Notation (JSON) Patch, Internet Engineering Task Force (IETF), URL: http://tools,ietf.org/html/rfc6902, Apr. 2013.

(Continued)

*Primary Examiner* — Liangche A Wang
*Assistant Examiner* — Johnny Aguiar
(74) *Attorney, Agent, or Firm* — Olive Law Group, PLLC

(57) ABSTRACT

Systems and methods for enhancing the performance of resource state polling are disclosed. According to an aspect, a method includes using at least one processor and memory for transmitting a request and a baseline timestamp for an updated resource state based on a current resource state, wherein the baseline timestamp defines a time period for the updated resource state. The method also includes determining the updated resource state based on the baseline timestamp and the current resource state. The method also includes providing the determined updated resource state and current timestamp of the determined updated resource state. Additionally, the method includes setting a current baseline resource state based on a current timestamp of the determined updated resource state.

16 Claims, 6 Drawing Sheets

(56) References Cited

U.S. PATENT DOCUMENTS

| | | | |
|---|---|---|---|
| 2009/0287818 A1* | 11/2009 | Tachibana | G06F 11/3006 709/224 |
| 2010/0115053 A1* | 5/2010 | Ryu | G06F 9/4445 709/217 |
| 2011/0238819 A1* | 9/2011 | Fukagawa | G06F 9/5083 709/224 |
| 2013/0295902 A1* | 11/2013 | Justen | H04W 8/22 455/418 |
| 2016/0050158 A1* | 2/2016 | Stephens | H04L 43/04 709/224 |
| 2017/0006030 A1* | 1/2017 | Krishnamoorthy | H04L 63/0884 |

OTHER PUBLICATIONS

RESTful Web Services: The basics, International Business Machines Corporation, Feb. 9, 2015.

* cited by examiner

SYSTEMS AND METHODS FOR ENHANCING PERFORMANCE OF RESOURCE STATE POLLING

TECHNICAL FIELD

The presently disclosed subject matter relates to resource polling of computing systems. More specifically, the presently disclosed subject matter relates to systems and methods for enhancing performance of resource state polling.

BACKGROUND

Networked based computing systems and devices are configured to transmit and receive various types of data via network communication links. These communication links perform at various levels. In part, because of the varying performing network communication links, computing systems and devices, significant performance problems occur today when polling managed endpoints such as computing systems and devices. As the use of the network and cloud computing becomes more prevalent it is critical to minimize these significant performance problems.

Various types of service oriented architectures are used to manage information technology devices and services. A service-oriented architecture (SOA) is an architectural pattern in which application components provide services to other components via a communications protocol, typically over the network. The principles of service-orientation should be independent of any vendor, product or technology. An Application Programming Interface (API) can make several singular services accessible, such as, for example, retrieving an online bank statement. In this example, the service is one discretely invocable operation. As an example, in the Web Services Description Language (WSDL), the "service" is a complete interface definition that may list several discrete operations. And elsewhere, the term "service" is used for a component that is encapsulated behind an interface. A large software application may be composed by connecting client components to remote services, which in turn depend on other remote services and so on. An SOA assists in the connection of distributed software components, and to connect them in a loosely coupled way that makes it easier to replace one component with another. Web-based services, computing and data transfers are large consumers of available bandwidth and because of the expectancy of high performance by the users of web-based services, optimal performance management of an endpoint device, such as a computing client or server is important. Representational State Transfer (REST) is an example of an architectural technology protocol, and an approach to communications that is used in the development of Web services. Simple Object Access Protocol (SOAP) is another example of an architectural technology protocol for network based services. The use of REST is often preferred over Simple Object Access Protocol (SOAP) because REST does not consume as much bandwidth.

A REST client may issue a hypertext transfer protocol (HTTP) GET request to instruct the receiving server to transmit the current state of a resource (a managed endpoint in our case) back to the REST client. A representation of the resource state requested is typically returned using a standard media type like JavaScript Object Notation (JSON) or Extensible Markup Language (XML). As an example, if JSON or XML are used and the representation or data set is large, the request can take an unacceptable amount of time to complete. It is often the case that the client has previously requested the resource state of the same resource and that most of the resource state will have changed only incrementally since the last request for the resource state. Returning the entire resource state is therefore unnecessary and inefficient. However, the hypertext transfer protocol (HTTP) does not provide a way to get only the incremental state that has changed.

A partial solution to this problem exists today in the form of what is referred to as a "conditional GET" request. In this approach, the REST client issues a GET request with an If-Modified-Since header that specifies a timestamp. If the resource has changed since the specified timestamp, the server returns the new resource state. Otherwise, the server, returns a 304 (Not Modified) error indicating that the resource state is unchanged. This eliminates an unnecessary transfer of state in the case where the resource has not changed at all but, if the resource has changed even slightly, the entire resource state is returned.

A similar problem exists when the client updates the state of a resource using the PUT method. An HTTP extension called PATCH has been defined that allows the client to specify only the parts of the resource state that the REST client desires to update, avoiding the need to transfer the entire resource state. However, no equivalent has been defined for GET operations.

An approach in which the resource state of a managed endpoint is partitioned into several categories, depending on how often the piece of state in question is expected to change exists. Frequently changing pieces of a resource state are put in one category, less frequently changing pieces of a resource state are put in another category, and so on. A timestamp indicating when any data of the resource state in a given category last changed is returned in response to a poll. The client, in a second request, can then request a resource state update in only the categories which have actually changed since the client last requested the resource state update. This approach requires foreknowledge of what data or pieces of information are to be categorized as frequently updated and what data does not frequently change. In view of the foregoing, there is a need for improved systems and methods for enhancing the performance of resource state polling.

SUMMARY

Disclosed herein are systems and methods for enhancing the performance of resource state polling. In an aspect, a method includes using at least one processor and memory for transmitting a request and a baseline timestamp for an updated resource state based on a current resource state, wherein the baseline timestamp defines a time period for the updated resource state. The method also includes determining the updated resource state based on the baseline timestamp and the current resource state. The method also includes providing the determined updated resource state and current timestamp of the determined updated resource state. Further, the method includes setting a current baseline resource state based on a current timestamp of the determined updated resource state.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

Figure 1:
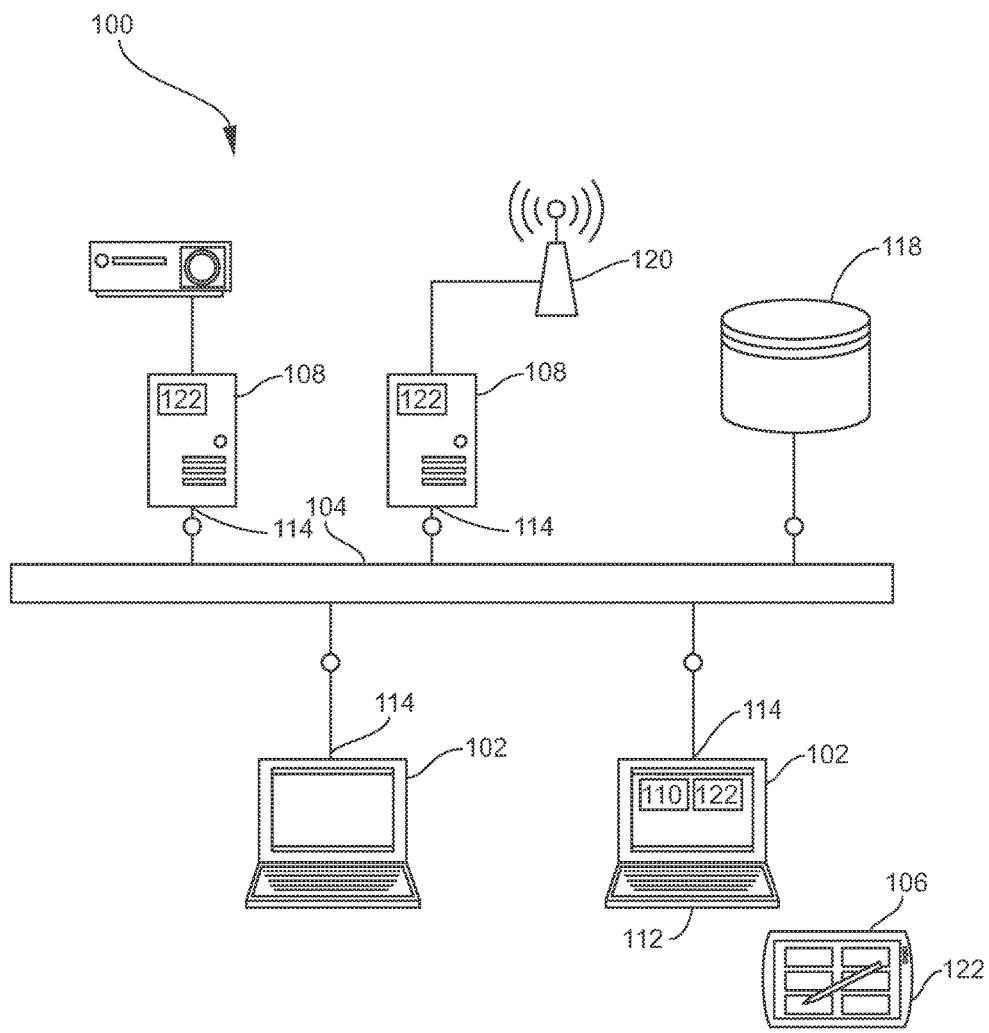
FIG. 1 illustrates a block diagram of example system elements of a computing device in accordance with embodiments of the present disclosure.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified computing device may include executable code and may, for instance, comprise one or more physical or logical blocks of computer instructions, which may, for instance, be organized as an object, procedure, function, or other construct. Nevertheless, the executables of an identified computing device need not be physically located together, but may comprise disparate instructions stored in different locations which, when joined logically together, comprise the computing device and achieve the stated purpose of the computing device.

An executable code of a computing device may be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure. A computing device may be a mobile computing device such as, for example, but not limited to, a smart phone, a cell phone, a pager, a personal digital assistant (PDA), a mobile computer with a smart phone client, or the like. A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on smart phone, the examples may similarly be implemented on any suitable computing device, such as a computer.

As referred to herein, the term "user interface" is generally a system by which users interact with a computing device. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

The presently disclosure is now described in more detail. For example, FIG. 1 illustrates a block diagram of an example system 100 according to embodiments of the present disclosure. The system 100 may be implemented in whole or in part in any suitable computing environment. A computing device 102 may be communicatively connected via a communications network 104, which may be any suitable local area network (LAN), either wireless (e.g., BLUETOOTH® communication technology) and/or wired. The computing device 102, a tablet device 106 in communication with the computing device 102, and other components, not shown, may be configured to acquire data within the computing or data analysis environment, to process the data, and to communicate the data to a centralized server 108. For example, the computing device 102 and tablet device 106 may operate together to implement a data analysis function and to communicate data related thereto to the server 108. The server 108 may reside in a local or remote location.

The components of the system 100 may each include hardware, software, firmware, or combinations thereof. For example, software residing in memory of a respective component may include instructions implemented by a processor for carrying out functions disclosed herein. As an example, the computing device 102 may each include a user interface 110 including a display (e.g., a touchscreen display), a barcode scanner, and/or other equipment for interfacing with intelligence personnel and for conducting data analysis. The computing device 102 may also include memory 112. The computing device 102 may also include a suitable network interface 114 for communicating with the network 104. The tablet device 106 may include hardware (e.g., image capture devices, scanners, and the like) for capture of various data within the computing environment. The system 100 may also include a smart phone device 116 configured similarly to the tablet device 106. The system 100 may also comprise a database 118 for storage of grammatical rules, word and phrase definitions and meanings, as an example. Further, the server 108 may be connected to the computing devices 102 via the network 104 or via a wireless network 120.

With continued reference to FIG. 1, the system 100 may include a web-based server 122. The web-based server 122 may execute on any one or more of the computing devices 102. As will be described in further detail in FIGS. 2-5, the web-based server 122 may be configured to receive requests and transmit responses from client devices, as an example. The web-based server 122 may be implemented in software, in hardware, in firmware, or combinations thereof. Client devices may include the computing device 102, the tablet device 106, the server 108, the smart phone device 116 and similar devices.

Figure 2:
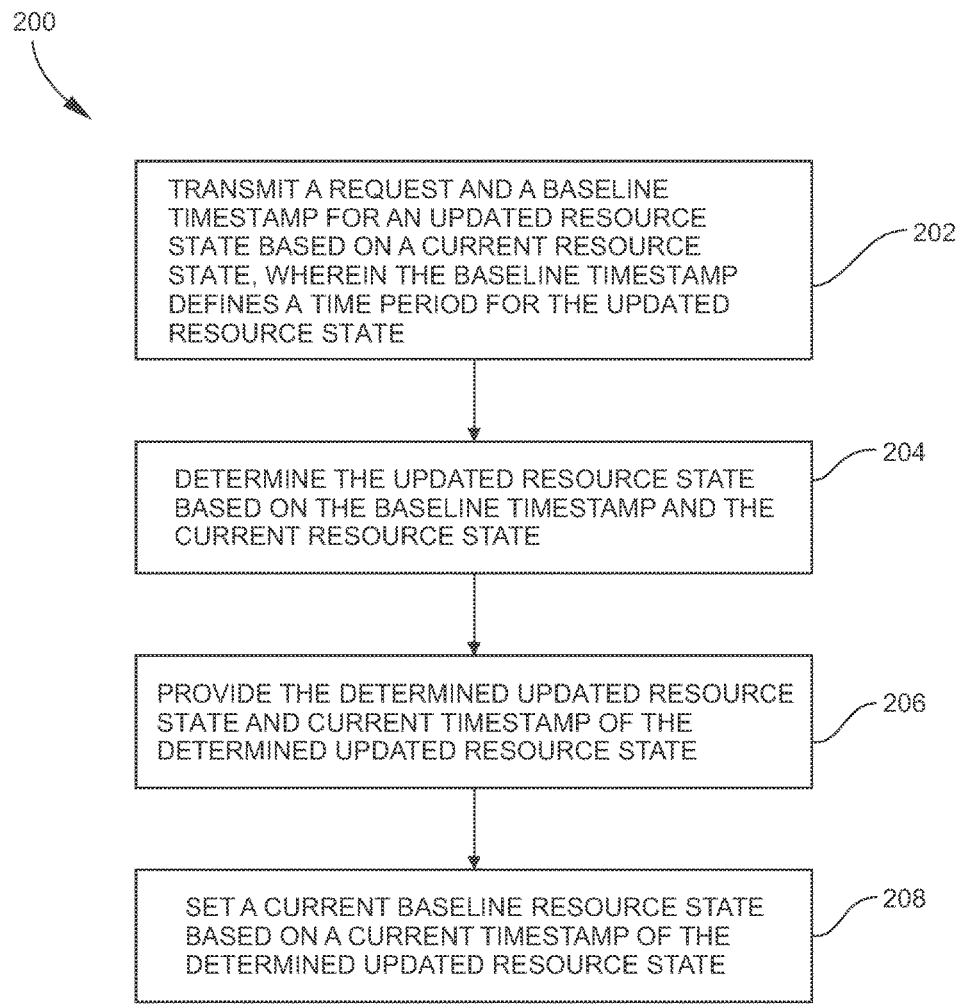
FIG. 2 illustrates a flowchart of an example method for systems and methods for enhancing the performance of resource state polling according to embodiments of the present disclosure.

FIG. 2 illustrates a flowchart of an exemplary method 200 for enhancing performance of resource state polling according to embodiments of the present disclosure. In this example, the method 200 is described as being implemented by the system 100 shown in FIG. 1, although it should be understood that the method 200 may alternatively be implemented by any other suitable system or computing device.

Referring to FIG. 2, the method includes transmitting 202 a request and a baseline timestamp for an updated endpoint resource state based on a current endpoint resource state. The baseline timestamp may define a time period for the updated endpoint resource state. In an example, the request for an updated endpoint resource state may be communicated using a specific request for the delta or incremental change in the endpoint resource state that may have occurred since the provided baseline timestamp. The baseline timestamp may indicate a time from which all incremental changes to the endpoint resource state is determined. The request may be transmitted from the computing device 102 or server 108 to any computing device 102 or server 108 configured to respond with the updated endpoint resource state. The transmit request and any communication between the computing devices 102 or the servers 108 may be communicated via the network 104. As an example, communication may be by HTTP over the network 104. As disclosed herein, the endpoint resource state may represent a web page, data in a database 118 or other information requested by the client. It is noted that the transmit request may be provided by any one of the computing devices 102 or servers 108 and may be transmitted to any one of the computing devices 102 or servers 108, including the same computing device 102 or server 108.

The method 200 of FIG. 2 also includes determining 204 the updated endpoint resource state based on the baseline timestamp and the current endpoint resource state. The endpoint resource state may be associated with any computing device 102 or server 108. As an example, the updated endpoint resource state may represent the state of uniform resource locator (URL) and/or web page(s) associated with the at least on URL or computing device 102 or server 108 associated with one or more URLs. The method 200 may use the baseline timestamp provided for in the transmit request to define the time period for determining 204 what, if any, updates to the endpoint resource state may have occurred and to subsequently provided to the requesting computing device 102.

The method 200 includes providing 206 the determined updated endpoint resource state to the requesting computing device or server. Providing the updated endpoint resource state may include any of the communication methods, technologies or protocols disclosed herein. As an example, providing the determined updated endpoint resource state using one of Javascript Object Notation (JSON) and XML. If a delta or change does not exist between the last updated endpoint resource state provided to the client and the current endpoint resource state, the computing device 102 or server 108 may be configured to provide a return error or other indication the communicating the desired deltas are not available or do not exist. The client may subsequently re-transmit the request, omitting the baseline timestamp or including another indication included with the transmitted request. In response, the computing device 102 or server 108 may provide the entire endpoint resource state as an updated endpoint resource state.

The method 200 includes setting 208 a current baseline endpoint resource state based on a current timestamp of the determined updated endpoint resource state. As an example, the current timestamp associated with time of providing any update endpoint resource state may become the baseline timestamp used for defining the baseline endpoint resource state. Further, the computing device 102 or server 108 may use any method to determine a baseline timestamp from which to save or determine the baseline updates. Alternatively, the computing device 102 or server 108 may save baselines and delta states based on a pre-determined time window. For example, every ten (10) seconds, one (1) minute, ten (10) minutes, and so forth, the computing device 102 or server 108 may save a state. The computing device 102 or server 108 may also use a timestamp associated with a time of one or more previous requests transmitted. It may be determined the several delta sets may become prohibitive in size and number. The computing device 102 and server 108 may at its discretion, set or reset the baseline timestamp, thereby establishing a new baseline timestamp. The computing device 102 or server 108 may also periodically delete baseline timestamps determined to no longer be required or desired. The computing device 102 or server 108 may be configured to save baseline timestamps from more than one client computing device 102 or server 108.

Figure 3:
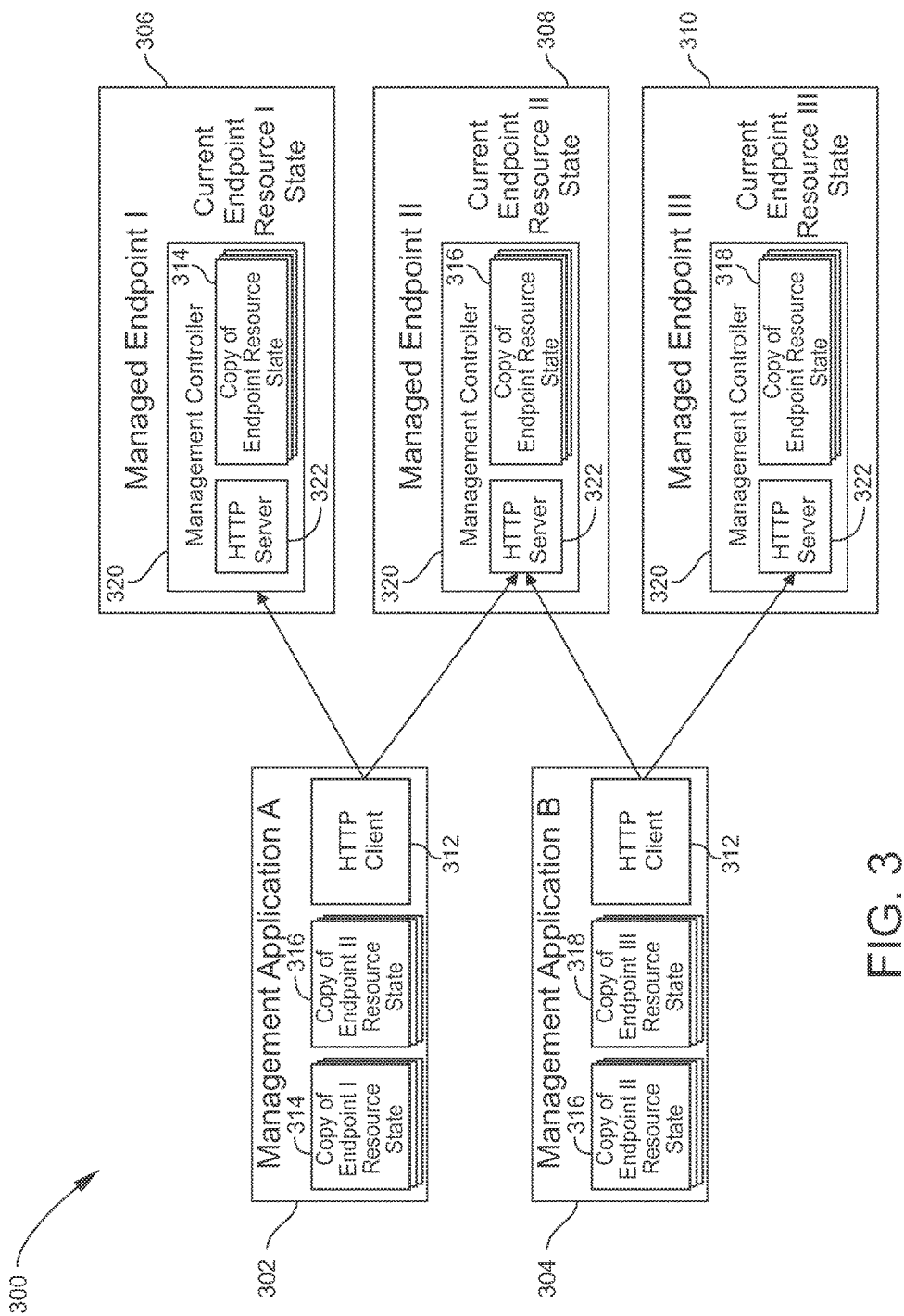
FIG. 3 illustrates a block diagram of an example process communication for systems and methods for enhancing the performance of resource state polling in accordance with an embodiment of the present disclosure.

FIG. 3 illustrates a block diagram of an example process communication system 300 for enhancing the performance of endpoint resource state polling in accordance with embodiments of the present disclosure. FIG. 3 is an example block diagram of the process communication 300 for two (2) management applications, management application A 302 and management application B 304 and three managed endpoints, managed endpoint I 306, managed endpoint II 308, and managed endpoint III 310. It is noted that there may be one or more management applications and one or more managed endpoints in direct or indirect communication. Indirect communication may be performed via an independent server separate and distinct from the computing device or server used to execute either the management application or managed endpoint. The management application and the managed endpoints may be program instructions executable on either the computing device 102 or server 108.

Each management application 302, 304 may have an embedded HTTP client 312, and each management application 302, 304 maintains copies of one or more endpoint resource states 314, 316, 318, each associated with the managed endpoints 306, 308, 310 respectively, that the management application(s) manage. Each managed endpoint 306, 308, 310 may have a management controller 320 (e.g., a small microprocessor) responsible for managing each of the associated managed endpoint(s) 306, 308, 310. As an example, a general industry term for the management controller 320 is a baseboard management controller (BMC). With respect to Lenovo system servers, for example, the management controller 320 may be referred to as an integrated management module (IMM). The management controller 320 may have an embedded HTTP server 322, and may maintain one or more copies of the endpoint resource state 314, 316, 318 of the respective managed endpoint(s), each corresponding to the endpoint resource state at a baseline timestamp or some specific point in time.

Figure 4A:
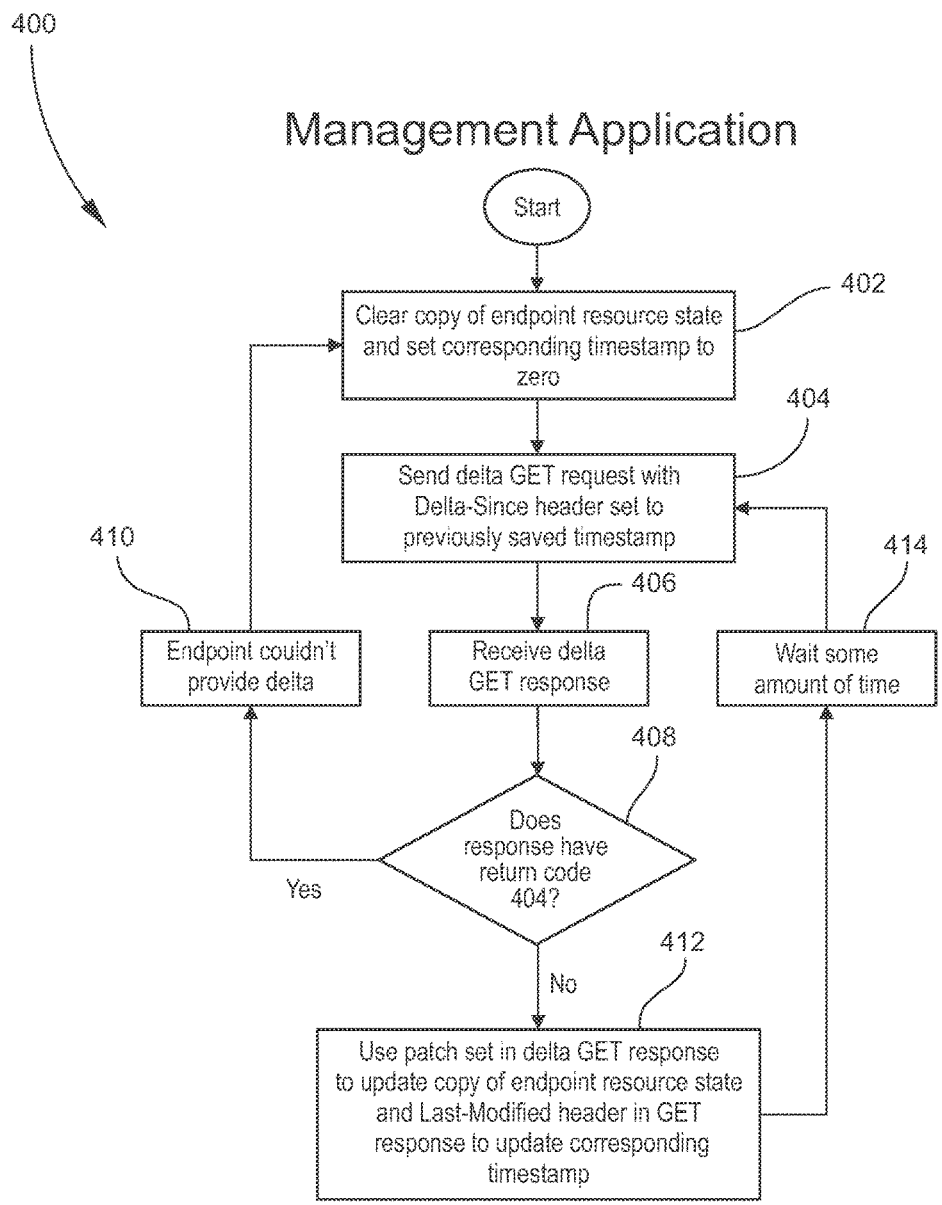
FIG. 4A illustrates a flowchart of an example method for systems for enhancing the performance of resource state polling from the perspective of a management application in accordance with an embodiment of the present disclosure.

FIG. 4A illustrates a flowchart of an example method 400 for enhancing the performance of endpoint resource state polling from the perspective of a management application 302, 304 in accordance with an embodiment of the present disclosure. In this example, the method 400 is described as being implemented by the system 100 shown in FIG. 1, although it should be understood that the method 400 may alternatively be implemented by any other suitable system or computing device.

Referring to FIG. 4A, the method includes clearing a copy of an endpoint resource states and setting a corresponding timestamp to zero. For example, one of the management applications 302, 304 shown in FIG. 4A may begin execution by clearing one or more copies of the endpoint resource state(s) 314, 316, 318 and setting corresponding timestamp to zero. Setting corresponding timestamp(s) to zero may be performed for one or more of the endpoint resource state(s) 314, 316, 318. This may indicate to the managed endpoint, that the requesting management application 302, 304 should return a full state not just a delta or incremental state.

The method of FIG. 4A includes sending 404 a delta GET request with a Delta-Since header set to a previously saved timestamp. Continuing the aforementioned example, the management application 302 or 304 may send 404 a delta or incremental GET request with a Delta-Since header set to previously saved timestamp. The method of FIG. 4A also includes receiving 406 delta GET response. Continuing the aforementioned example, the management application 302 or 304 may subsequently receive 406 a delta GET response. The delta GET response may be a full or delta resource state based upon the timestamp transmitted with the delta GET request at step 404. The managed endpoint(s) 306, 308, 310 may return a response code or error code other than the full or delta state requested.

The method of FIG. 4A includes determining 408 whether the response have a return code. Continuing the aforementioned example, the managed endpoint 306, 308, or 310 may return 408 a response code or message. This response code may indicate a managed endpoint was unable to provide a delta of the endpoint resource state. This response code may also indicate a delta of the endpoint resource state does not exist or some other indication of a managed endpoint 306, 308, 310 condition or state. As an example, an error code of "404" may be transmitted indicating no delta state could be provided to the management application. The method includes returning 410 to step 402 in the instance that the endpoint could not provide the delta state.

If the response code is a delta or incremental data set, the method may proceed to step 412 wherein the method includes using the patch set in the delta GET response to update a copy of the endpoint state and last-modified header in the GET response to update the corresponding timestamp. Continuing the aforementioned example, in this instance the management application may use the patch set to update the current copy of the endpoint resource state in the associated management application 302 or 304. Subsequently, the method includes waiting 414 some predefined amount of time. For example, the management application 302 or 304 may wait for a defined period of time to before returning to step 404 to send a delta or incremental GET request with a Delta-Since header set to previously saved timestamp, repeating as necessary.

Figure 4B:
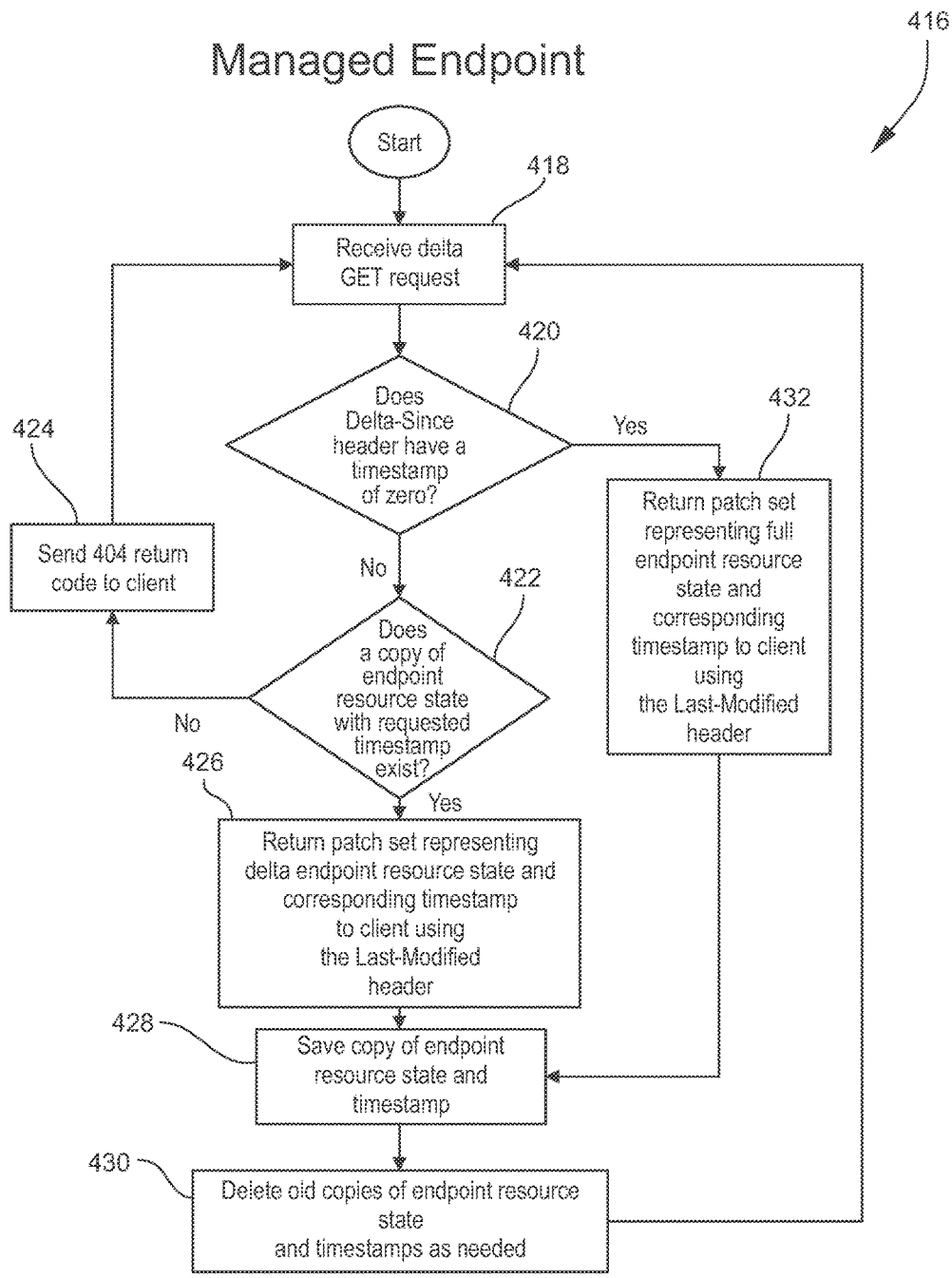
FIG. 4B illustrates a flowchart of an example method for systems for enhancing the performance of resource state polling from the perspective of a managed endpoint in accordance with an embodiment of the present disclosure.

FIG. 4B illustrates a flowchart of an exemplary method 416 for enhancing the performance of endpoint resource state polling from the perspective of a managed endpoint in accordance with an embodiment of the present disclosure. In this example, the method 416 is described as being implemented by the system 100 shown in FIG. 1, although it should be understood that the method 416 may alternatively be implemented by any other suitable system or computing device.

Referring to FIG. 4B, the method 416 may begin by receiving 418 a delta GET request indicating the management application 400 is requesting an update. The method 416 may subsequently determine 420 the content of the delta-since header and whether it has a valid timestamp or has a value of zero or other value indicating a message that requires subsequent parsing. If yes, the method 416 includes determining 422 whether a valid endpoint resource state with a corresponding delta-since header exists. If a valid endpoint resource state with a corresponding delta-since header does not exist, the method 416 subsequently returns to a waiting state in anticipation of receiving 418 the delta GET request indicating the management application 400 is requesting an update and respond to the request by sending an indication 424 no corresponding copy of an endpoint resource state exists. As an example, the managed endpoint may provide a return code of "404" or other code indicating a corresponding copy does not exist. If a valid endpoint resource state with a corresponding delta-since header exists, the method 416 may then return 426 a patch set representing a delta endpoint resource state and corresponding timestamp to the management application 400 using a last-modified header. A last-modified header may represent the last endpoint resource state captured by the managed endpoint. The method 416 may then delete 430 old copies of endpoint resource states and timestamps as desired. If, however, the method 416 determines 420 the content of the delta-since header has a valid timestamp the method 416 may then return 432 a patch set representing a full endpoint resource state and corresponding timestamp to the client or management application 400 using the last-modified header.

Figure 5:
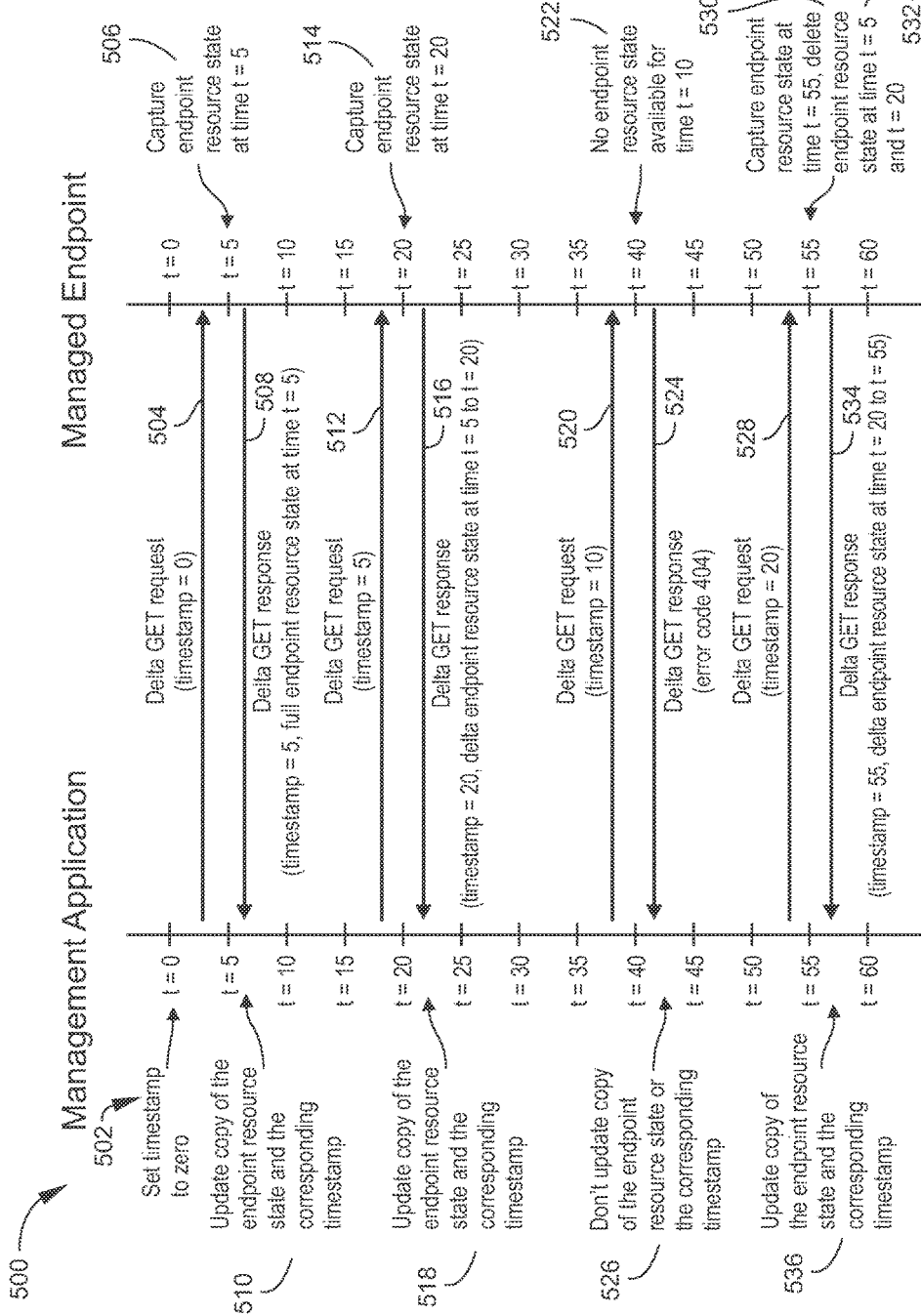
FIG. 5 illustrates a message flow diagram of an example flow of messaging for systems for enhancing the performance of resource state polling in accordance with an embodiment of the present disclosure.

FIG. 5 illustrates a message flow diagram of example messaging 500 for enhancing the performance of endpoint resource state polling in accordance with an embodiment of the present disclosure. In this example, the message flow 500 is described as being implemented by the system 100 shown in FIG. 1, although it should be understood that this messaging 500 may alternatively be implemented by any other suitable system or computing device.

The messaging 500 shown in FIG. 5 may alternatively be viewed as a combined time sequenced view of the methods 400 and 416 described with respect to FIGS. 4A and 4B, as an example. The timestamps noted by the "t=X" nomenclature represents a time sequence order to events described in FIG. 5. The timestamp numbering noted is not necessarily relative in scale and may be any amount of time or any timestamp dependent upon a variety of factors, including but not limited to, the type of computing device (e.g., processor, memory, etc.) and software used to implement the method 400, 416 or system 100, as an example.

The message flow may begin with a computing device setting a timestamp to zero 502. Setting a corresponding timestamp to zero may be performed for one or more of the endpoint resource states 314, 316, 318. This may indicate to the managed endpoint, that the requesting management application 302, 304 is to be sent a full state not just a delta or incremental state. The management application(s) 302, 304 may subsequently send 504 a delta or incremental GET request with a Delta-Since header, where the delta-since header is set to a previously saved timestamp, to a server or managed endpoint 306, 308, 310. The managed endpoint 306, 308, 310 may capture 506 an endpoint resource state at a timestamp t=5, as an example. The endpoint resource state captured 506 at time t=5 may be stored with the associated timestamp. In response to receiving 504 the delta GET request with a timestamp of t=0, the managed endpoint may respond with a delta GET response 508. The response 508 using the delta GET response may include a timestamp of t=5, and a full endpoint resource state associated with the timestamp of t=5. The management application may then use the received response 508 to update 510 a copy of the endpoint resource state and corresponding timestamp of t=5.

To update or refresh the management application's copy of the endpoint resource state, the management application sends 512 another delta GET request with the most recent timestamp of the endpoint resource state. In this example, the most recent timestamp is t=5. The managed endpoint 306, 308, 310 that receives the delta GET request may capture 514 an endpoint resource state at t=20. The managed endpoint 306, 308, 310 may subsequently respond 516 with a delta endpoint resource state based on the difference between the captured 506 endpoint resource state at t=5 and the captured 514 endpoint resource state at t=20. The management application receiving 518 the delta GET response may update the stored copy of the endpoint resource state and the corresponding timestamp (e.g., t=20) at or within the management application. The management application 302, 304, may subsequently send 520 another delta GET request with a timestamp representing another timestamp. In this example, the timestamp may be t=10. The managed endpoint 306, 308, 310 may not have 522 a copy of the endpoint resource state and, in response, may be configured to send 524 a delta GET response including an error code or other message indicating that no endpoint resource state is available. Upon receiving a delta GET response with an error code or other message, the management application 302, 304 may take any configured action. In embodiments, the configured action may be to not update 526 the copy of the endpoint resource state or the corresponding timestamp. In other embodiments, the configured action may be to take any other action. The management application may also send 528 a delta GET request including the last stored or received timestamp to the managed endpoint. In this example, the delta GET request may include the last received timestamp where t=20 which may have been received 516 with a previous delta GET response. The managed endpoint may subsequently capture 530 the current endpoint resource state at the current time. In this example, the current time is associated with the timestamp t=55. In response to the sent 528 delta GET request and/or the captured 530 current endpoint resource state, the managed endpoint may then delete 532 the endpoint resource state at time t=5 and t=20 if desired. In response to receiving the sent 528 delta GET request, the managed endpoint may provide 534 a delta GET response, including a current timestamp (e.g., t=55) and a delta endpoint resource state based on the delta in the endpoint resource state from t=20 to t=55. Based on receiving 534 the delta GET response the management application may update 536 the copy of the endpoint resource state and the corresponding timestamp.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   clearing, by a processor, a current endpoint resource state of an endpoint device;
   setting, by the processor, a baseline timestamp of the current endpoint resource state to zero;
   transmitting a first delta request with a first delta header containing the baseline timestamp to the endpoint device;
   receiving a first delta response from the endpoint device, the first delta response containing a first response code and a first patch set, wherein the first patch set represents a first current endpoint resource state associated with a first current timestamp;
   updating, in memory, the current endpoint resource state based on the first current endpoint resource state and the first current timestamp;
   setting the baseline timestamp to the first current timestamp;
   transmitting a second delta request with a second delta header set to the first current timestamp to the endpoint device;
   determining, by the endpoint device, an updated endpoint resource state of the endpoint device based on the second delta request, wherein the updated endpoint resource state comprises an incremental change to computing data of the endpoint device based on a predetermined time period of receiving the first current timestamp;
   receiving, by the processor, a second delta response, wherein the second delta response contains a second response code and a second patch set, wherein the second patch set comprises the updated endpoint resource state of the endpoint device associated with a second current timestamp;
   updating, at a location stored in the memory, the current endpoint resource state based on the updated endpoint resource state; and
   setting the baseline timestamp to the second current timestamp.

2. The method of claim 1, wherein the first and second delta request are transmitted using Hypertext Transfer Protocol (HTTP).

3. The method of claim 1, wherein determining, by the endpoint device, the updated endpoint resource state of the endpoint device comprises using at least one of a Javascript Object Notation (JSON) patch and an Extensible Markup Language (XML) patch header.

4. The method of claim 1, wherein the updated endpoint resource state represents an updated state of at least one uniform resource locator (URL).

5. The method of claim 4, further comprising deleting at least one of the updated current endpoint resource states associated with the at least one URL.

6. The method of claim 1, further comprising displaying a message indicator that indicates no updated endpoint resource state is stored when the baseline timestamp is set to zero.

7. A system comprising:
   a computing device comprising at least one processor and memory that:
     clears a current endpoint resource state of an endpoint device;
     sets a baseline timestamp of the current endpoint resource state to zero;
     transmits a first delta request with a first delta header containing the baseline timestamp to the endpoint device;
     receives, a first delta response from the endpoint device, the first delta response containing a first response code and a first patch set, wherein the first patch set represents a first current endpoint resource state associated with a first current timestamp;
     updates, in the memory, the current endpoint resource state based on the first current endpoint resource state and the first current timestamp;
     sets the baseline timestamp to the first current timestamp;
     transmits, a second delta request with a second delta header set to the first current timestamp, to the endpoint device;
     determines, by the endpoint device, an updated endpoint resource state of the endpoint device based on the second delta request, wherein the updated endpoint resource state comprises an incremental change to computing data of the endpoint device based on a predetermined time period of receiving the first current timestamp;
     receives, by the processor, a second delta response, wherein the second delta response contains a second response code and a second patch set, wherein the second patch set comprises the updated endpoint resource state of the endpoint device associated with a second current timestamp;
     updates, at a location stored in the memory, the current endpoint resource state based on the updated endpoint resource state; and
     sets the baseline timestamp to the second current timestamp.

8. The system of claim 7, wherein the at least one processor and memory transmits the first and second delta request using Hypertext Transfer Protocol (HTTP).

9. The system of claim 7, wherein the endpoint device determines an updated endpoint resource state of the endpoint device using at least one of a Javascript Object Notation (JSON) patch and an Extensible Markup Language (XML) patch header.

10. The system of claim 7, wherein the updated endpoint resource state represents an updated state of at least one uniform resource locator (URL).

11. The system of claim 10, wherein the at least one processor and memory deletes at least one of the updated current endpoint resource states associated with the at least one URL.

12. The system of claim 7, wherein the at least one processor and memory displays a message indicator that indicates no updated endpoint resource state is stored when the baseline timestamp is set to zero.

13. A computer program product, the computer program product comprising a non-transitory computer readable storage medium having program instructions embodied therewith, the program instructions executable by a computing device comprising at least one processor and memory to cause the computing device to:
- clear a current endpoint resource state of an endpoint device;
- set a baseline timestamp of the current endpoint resource state to zero;
- transmit a first delta request with a first delta header containing the baseline timestamp to the endpoint device;
- receive a first delta response from the endpoint device, the first delta response containing a first response code and a first patch set, wherein the first patch set represents a first current endpoint resource state associated with a first current timestamp;
- update, in memory, the current endpoint resource state based on the first current endpoint resource state and the first current timestamp;
- set the baseline timestamp to the first current timestamp;
- transmit a second delta request with a second delta header set to the first current timestamp to the endpoint device;
- determine, by the endpoint device, an updated endpoint resource state of the endpoint device based on the second delta request, wherein the updated endpoint resource state comprises an incremental change to computing data of the endpoint device based on a predetermined time period of receiving the first current timestamp;
- receive, by the processor, a second delta response, wherein the second delta response contains a second response code and a second patch set, wherein the second patch set comprises the updated endpoint resource state of the endpoint device associated with a second current timestamp;
- update, at a location stored in the memory, the current endpoint resource state based on the updated endpoint resource state; and
- set the baseline timestamp to the second current timestamp.

14. The computer program product of claim 13, wherein the program instructions executable by the computing device causes the computing device to transmit the first and second delta request using Hypertext Transfer Protocol (HTTP).

15. The computer program product of claim 13, wherein the program instructions executable by the computing device causes the computing device to determine the updated endpoint resource state of the endpoint device using at least one of a Javascript Object Notation (JSON) patch and an Extensible Markup Language (XML) patch header.

16. The computer program product of claim 13, wherein the updated endpoint resource state represents an updated state of at least one uniform resource locator (URL).

* * * * *